(12) United States Patent
Kawahito

(10) Patent No.: US 11,023,212 B1
(45) Date of Patent: Jun. 1, 2021

(54) EXECUTING A PART OF A COMPILER GENERATED CODE AS A FUNCTION

(71) Applicant: INTERNATIONAL BUSINESS MACHINES CORPORATION, Armonk, NY (US)

(72) Inventor: Motohiro Kawahito, Kanagawa-ken (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 13 days.

(21) Appl. No.: 16/677,315

(22) Filed: Nov. 7, 2019

(51) Int. Cl.
 G06F 8/30 (2018.01)
 G06F 8/41 (2018.01)
 G06F 9/38 (2018.01)
 G06F 9/30 (2018.01)

(52) U.S. Cl.
 CPC ............... *G06F 8/37* (2013.01); *G06F 8/441* (2013.01); *G06F 8/447* (2013.01); *G06F 9/30101* (2013.01); *G06F 9/3806* (2013.01)

(58) Field of Classification Search
 CPC . G06F 8/37; G06F 8/441; G06F 8/447; G06F 9/30101; G06F 9/3806; G06F 9/5016; G06F 11/3668
 See application file for complete search history.

(56) References Cited

U.S. PATENT DOCUMENTS

| 6,598,112 B1* | 7/2003 | Jordan | G06F 9/445 711/2 |
| 6,901,583 B1* | 5/2005 | Park | G06F 11/3688 703/26 |
| 8,448,130 B1 | 5/2013 | Pillarisetti et al. | |

(Continued)

*Primary Examiner* — Phillip H Nguyen
(74) *Attorney, Agent, or Firm* — Tutunjian & Bitetto, P.C.; Randall Bluestone

(57) ABSTRACT

A method is provided for validating a compiler-generated program portion that forms an optimized runnable code relative to an input runnable code. The method computes respective data sets used by the compiler-generated program portion. The respective data sets include (i) memory inputs UM, (ii) constant data memory areas UM_CONST, (iii) output memory areas DM, and (iv) output registers DR. The method copies the compiler-generated program portion to another memory area from a current memory area and appends a return instruction back to the current memory area at each exit point of the compiler-generated program portion. The method computes minimum and maximum base register offsets for base registers, from a union formed from a subset of the respective data sets. The method computes an allocation size for each of the base registers and an address assigned to each of the base registers. The method executes the copied compiler-generated program portion using (a) the minimum and maximum base register offsets, (b) the allocation size, and (c) the address assigned to each of the base registers, executes the input runnable code, examines results of the input runnable code in the output memory areas DM and of the compiler-generated program portion in the output (Continued)

registers DR, and indicates that the compiler-generated program portion is valid responsive to the results being identical.

20 Claims, 3 Drawing Sheets

(56) References Cited

U.S. PATENT DOCUMENTS

| | | | |
|---|---|---|---|
| 9,442,707 | B2 | 9/2016 | Sathyanathan et al. |
| 9,858,057 | B2 | 1/2018 | Venkatasubramanian |
| 10,387,293 | B2 * | 8/2019 | Staples ............... G06F 11/3668 |
| 2005/0289517 | A1 * | 12/2005 | Balfe .................. G06F 11/3668 |
| | | | 717/126 |
| 2010/0306450 | A1 * | 12/2010 | Nard ....................... G06F 21/79 |
| | | | 711/103 |
| 2014/0245273 | A1 | 8/2014 | Raikin et al. |
| 2018/0307591 | A1 * | 10/2018 | Lin ........................... G06K 9/78 |

* cited by examiner

EXECUTING A PART OF A COMPILER GENERATED CODE AS A FUNCTION

BACKGROUND

The present invention generally relates to computer processing, and more particularly to executing a part of a compiler generated code as a function. When it is desired to test code generated by a compiler, it is common to execute the whole program or function. While a compiler is under a development phase, a small piece of code can be tested. However, such an approach cannot be used to test customer code. However, customers strongly want the same behavior before and after optimization of their code by the compiler. Thus, there is a need for a way to execute a part of a compiler generated code when testing code generated by the compiler.

SUMMARY

According to an aspect of the present invention, a computer-implemented method is provided for validating a compiler-generated program portion that forms an optimized runnable code relative to an input runnable code. The method includes computing, by a hardware processor, respective data sets used by the compiler-generated program portion. The respective data sets include (i) memory inputs UM, (ii) constant data memory areas UM_CONST, (iii) output memory areas DM, and (iv) output registers DR. The method further includes copying, by the hardware processor, the compiler-generated program portion to another memory area from a current memory area and appending a return instruction back to the current memory area at each exit point of the compiler-generated program portion. The method also includes computing, by the hardware processor, minimum and maximum base register offsets for base registers, from a union formed from a subset of the respective data sets. The method additionally includes computing, by the hardware processor, an allocation size for each of the base registers and an address assigned to each of the base registers. The method further includes executing, by the hardware processor, the copied compiler-generated program portion using (a) the minimum and maximum base register offsets, (b) the allocation size, and (c) the address assigned to each of the base registers, executing the input runnable code, examining results of the input runnable code in the output memory areas DM and of the compiler-generated program portion in the output registers DR, and indicating that the compiler-generated program portion is valid responsive to the results being identical.

According to yet another aspect of the present invention, a computer program product is provided for validating a compiler-generated program portion that forms an optimized runnable code relative to an input runnable code. The computer program product includes a non-transitory computer readable storage medium having program instructions embodied therewith. The program instructions are executable by a computer to cause the computer to perform a method. The method includes computing, by a hardware processor, respective data sets used by the compiler-generated program portion. The respective data sets include (i) memory inputs UM, (ii) constant data memory areas UM_CONST, (iii) output memory areas DM, and (iv) output registers DR. The method further includes copying, by the hardware processor, the compiler-generated program portion to another memory area from a current memory area and appending a return instruction back to the current memory area at each exit point of the compiler-generated program portion. The method also includes computing, by the hardware processor, minimum and maximum base register offsets for base registers, from a union formed from a subset of the respective data sets. The method additionally includes computing, by the hardware processor, an allocation size for each of the base registers and an address assigned to each of the base registers. The method further includes executing, by the hardware processor, the copied compiler-generated program portion using (a) the minimum and maximum base register offsets, (b) the allocation size, and (c) the address assigned to each of the base registers, executing the input runnable code, examining results of the input runnable code in the output memory areas DM and of the compiler-generated program portion in the output registers DR, and indicating that the compiler-generated program portion is valid responsive to the results being identical.

According to yet another aspect of the present invention, a computer processing system is provided for validating a compiler-generated program portion that forms an optimized runnable code relative to an input runnable code. The computer processing system includes a memory device including program code stored thereon. The computer processing system further includes a hardware processor, operatively coupled to the memory device, and configured to run the program code stored on the memory device to compute, by a hardware processor, respective data sets used by the compiler-generated program portion. The respective data sets include (i) memory inputs UM, (ii) constant data memory areas UM_CONST, (iii) output memory areas DM, and (iv) output registers DR. The hardware processor further runs the program code to copy the compiler-generated program portion to another memory area from a current memory area and appending a return instruction back to the current memory area at each exit point of the compiler-generated program portion. The hardware processor also runs the program code to compute minimum and maximum base register offsets for base registers, from a union formed from a subset of the respective data sets. The hardware processor additionally runs the program code to compute an allocation size for each of the base registers and an address assigned to each of the base registers. The hardware processor also runs the program code to execute, the copied compiler-generated program portion using (a) the minimum and maximum base register offsets, (b) the allocation size, and (c) the address assigned to each of the base registers, execute the input runnable code, examine results of the input runnable code in the output memory areas DM and of the compiler-generated program portion in the output registers DR, and indicate that the compiler-generated program portion is valid responsive to the results being identical.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to executing a part of a compiler generated code as a function.

One or more embodiments of the present invention provide a binary optimizer, which optimizes the input runnable code.

In an embodiment, the present invention executes (i) a part of an input code and (ii) the corresponding optimized code, with several input data in a compile phase of a binary optimizer. The two result sets (for input and optimized code) of execution are compared. If the results are the same, then the optimized code is used. If the results are different, then the input code is used.

The binary optimizer takes the output from a source language compile step, that is the object code or binary file, and attempts to replace identifiable sections of the code with replacement code that is more efficient (e.g., more algorithmically efficient, to improve speed).

Embodiments of the present invention can execute fine grained code. For example, embodiments of the present invention can execute one to dozens of instructions, which correspond to a single node and its parameters in an intermediate language of a compiler. Therefore, the present invention is very effective and accurate for testing code portions.

Figure 1:
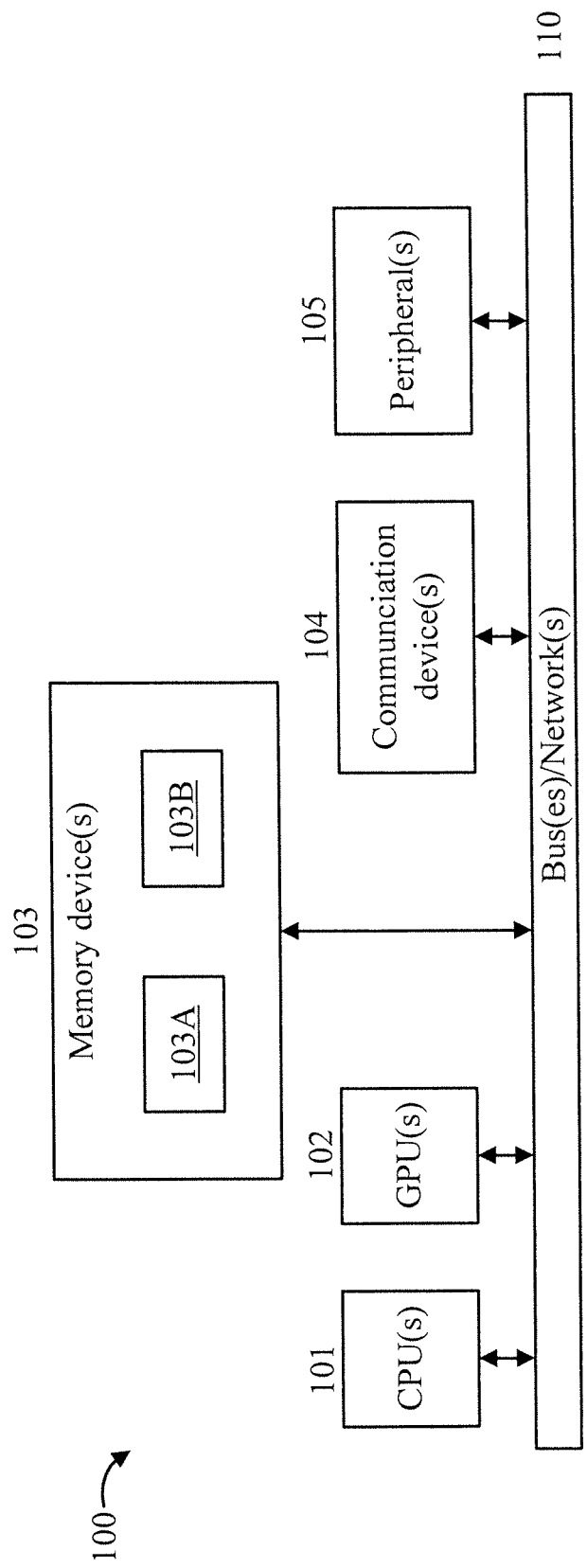
FIG. 1 is a block diagram showing an exemplary processing system 100, in accordance with an embodiment of the present invention.

FIG. 1 is a block diagram showing an exemplary processing system 100, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

In an embodiment, memory devices 103 can store, for example, a compiler 103A and a code generator 103B.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As used herein, the term "hardware processor subsystem" or "hardware processor" in short refers to a processor, memory, and software combination that cooperate to perform one or more specific tasks. In an embodiment, the hardware processor subsystem can include one or more data processing elements (e.g., logic circuits, etc.). In an embodiment, the one or more data processing elements can be included in a central processing unit, a graphics processing unit, and/or a separate processor or computing element-based (e.g., logic gates, etc.) controller. In an embodiment, the hardware processor subsystem can include one or more on-board memories (e.g., caches). In an embodiment, the hardware processor subsystem can include one or more other memories (e.g., ROM, RAM, BIOS). In an embodiment, the hardware processor subsystem can include and execute one or more software applications. In an embodiment, the one or more software applications can include the operating system and/or one or more other applications and/or specific code to achieve a specified result. These and other variations of a hardware processor subsystem are readily determined given the teachings of the present invention provided herein.

Thus, in accordance with one or more embodiments of the present invention, a hardware processor running a program (e.g., a binary optimizer) that modifies the input runnable code has an "execution unit", which executes a part of generated code as a function. The execution unit executes both the target instructions in the input code and the generated code corresponding to the optimized code. Then, the hardware processor compares the two result sets. If the two result sets are the same, then the optimized code is used as the generated code. If the results are different, then the input code is used as the generated code.

Embodiments of the present invention can involve a base register. Most load and store instructions include an offset and two register identifiers. One register is the base register. The other register is the source (for a write) or destination (for a read). The offset is added to a base register to get the address. Forming the address as a base register plus offset allows single instructions to access data structures.

Figure 2:
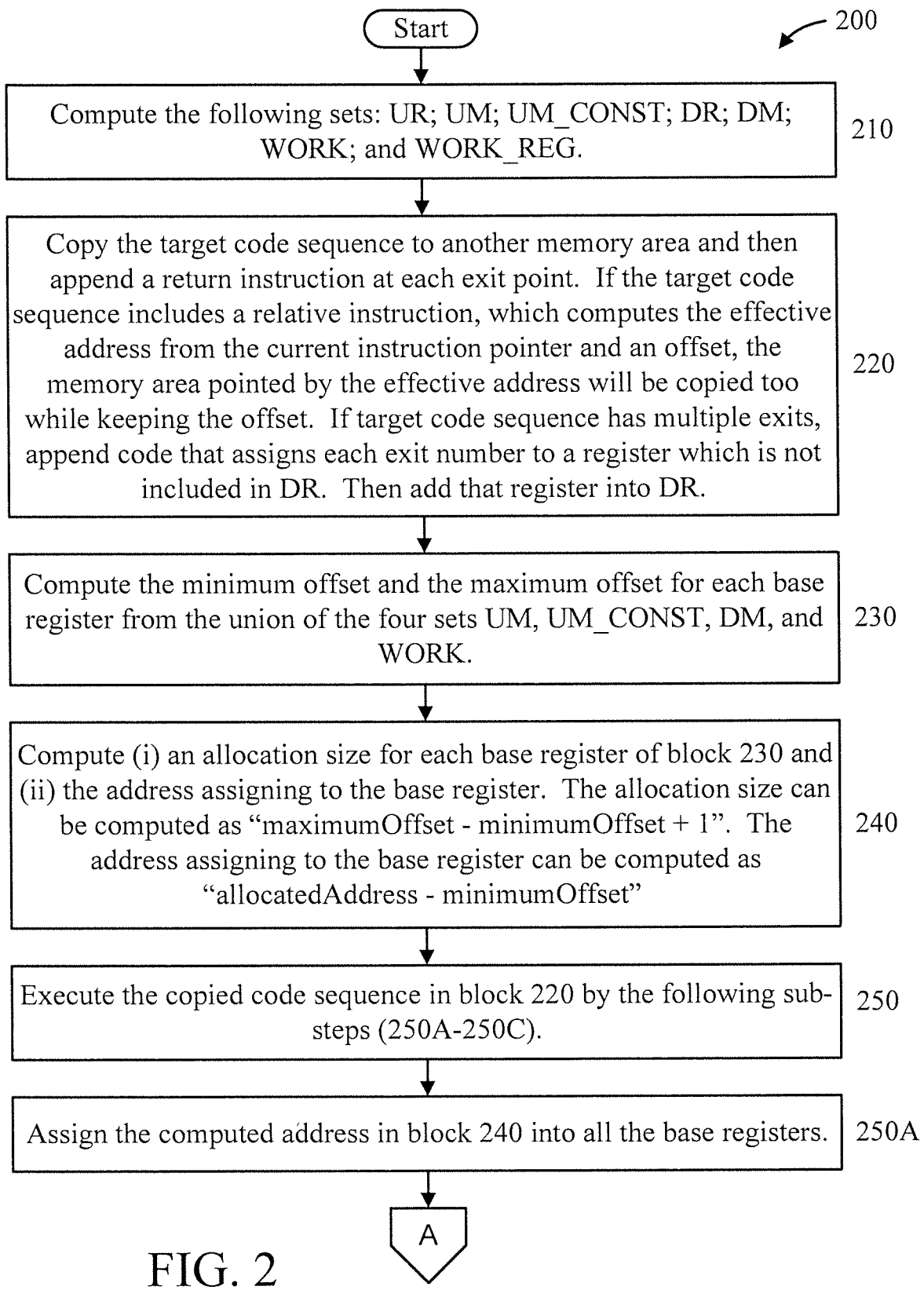
FIGS. 2-3 are flow diagrams showing an exemplary method 200 for testing a part of a generated program code for validation, in accordance with an embodiment of the present invention.
Figure 3:
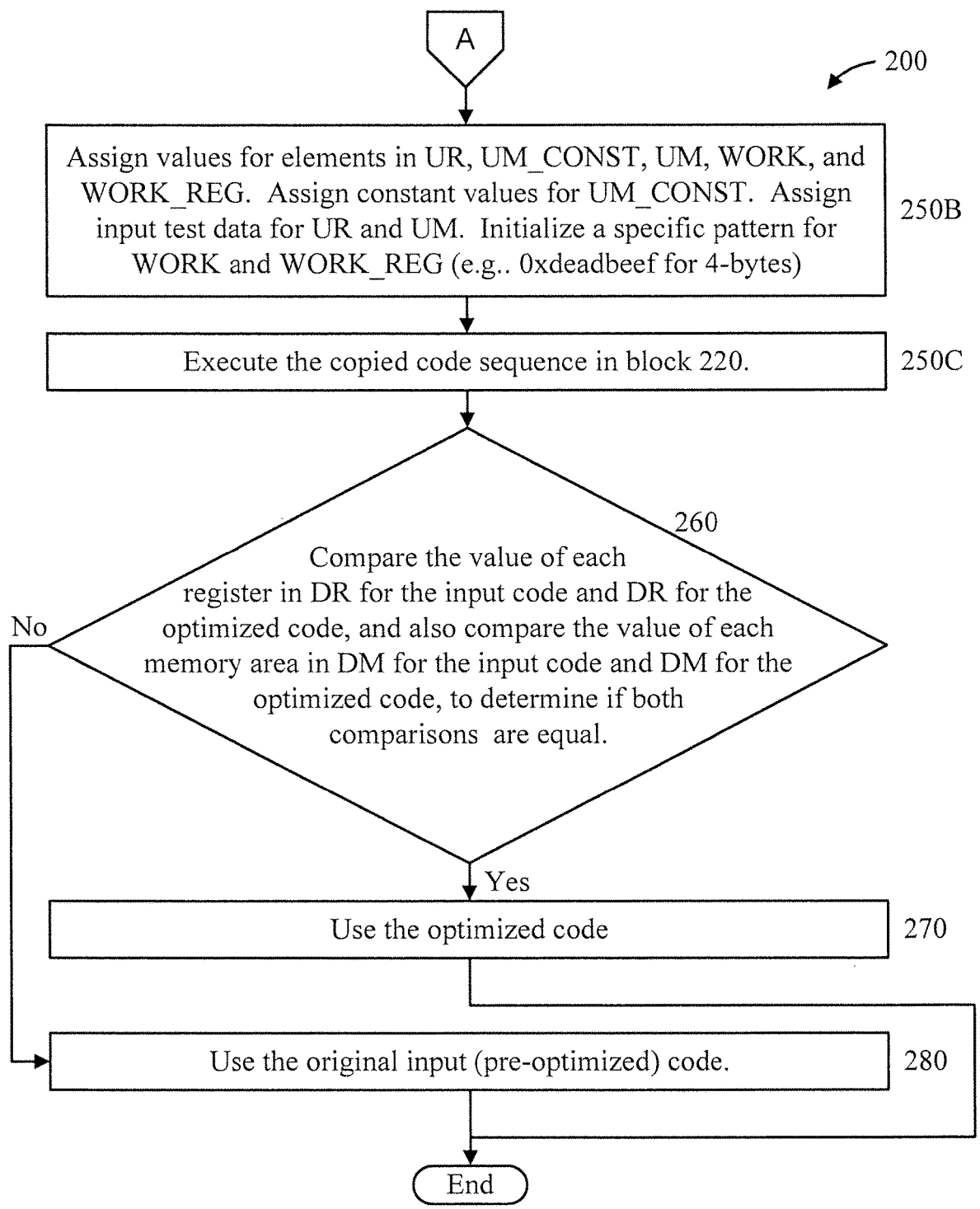

FIGS. 2-3 are flow diagrams showing an exemplary method 200 for testing a part of a generated program code for validation, in accordance with an embodiment of the present invention. Method 200 can involve the steps performed by the aforementioned execution unit associated with the binary optimizer.

At block 210, compute the following sets: UR; UM; UM_CONST; DR; DM; WORK; and WORK_REG. Any technique can be used to determine these sets, including using information obtained from a code generator of the generated program code.

The following set definitions apply.

UR: Set of input parameters on registers at an entry point of the target code sequence.

UM: Set of input parameters on memory areas at an entry point of the target code sequence.

UM_CONST: Set of memory areas having constant data. This set can have information of address and access size.

DR: Set of output registers of the target code sequence.

DM: Set of output memory areas of the target code sequence.

WORK: Set of the other memory areas accessed by the target code sequence.

WORK_REG: Set of registers used in the target code sequence except for UR and except for base registers.

It is to be appreciated that vector registers in UR or DR can have information of access areas in vector registers.

It is to be further appreciated that an element of "set of memory areas" will have information of address and access size. Vector registers in UR or DR will have information of access areas in vector registers.

It is to be further appreciated that binary optimizers or simulators often map registers in the input code to virtual registers in memory. In such a case, a load or store for a virtual register in memory is treated as a register access in the input code. It is presumed for the optimized code 2 in the practical example explained hereinafter.

At block 220, copy the target code sequence to another memory area and then append a return instruction at each exit point. If the target code sequence includes a relative instruction, which computes the effective address from the current instruction pointer and an offset, the memory area pointed by the effective address will be copied too while keeping the offset. If target code sequence has multiple exits, append code that assigns each exit number to a register which is not included in DR. Then add that register into DR.

At block 230, compute (i) an allocation size for each base register of block 220 and (ii) the address assigning to the base register. In an embodiment, the allocation size can be computed as "maximumOffset−minimumOffset+1". In an embodiment, the address assigning to the base register can be computed as "allocatedAddress−minimumOffset".

At block 240, compute the minimum offset and the maximum offset for each base register from the union of the four sets UM, UM_CONST, DM, and WORK.

At block 250, execute the copied code sequence in block 220 by the following sub-blocks (250A-250C).

At block 250A, assign the computed address in block 240 into all the base registers.

At block 250B, assign values for elements in UR, UM_CONST, UM, WORK, and WORK_REG. Assign constant values for UM_CONST. Assign input test data for UR and UM. Initialize a specific pattern for WORK and WORK_REG (e.g.: 0xdeadbeef for 4-bytes)

At block 250C, execute the copied code sequence in block 220.

At block 260, compare the value of each register in DR for the input code and DR for the optimized code, and also compare the value of each memory area in DM for the input code and DM for the optimized code. If both comparisons are equal, then proceed to block 270. Otherwise, proceed to block 280.

At block 270, use (execute) the optimized code.

At block 280, use (execute) the original input (pre-optimized) code.

Further regarding block 280, it is to be noted that when the results of the original code and the optimized code do not match, that is indicative of a problem in the optimized code, that is, an undesirable (e.g., incorrect) result. Thus, this optimized code can be tested and not deployed based on such undesirable results. On the other hand, when the results match, then the optimized code, with its benefits (e.g., computational efficiency), can be used.

A description will now be given of a practical example, in accordance with an embodiment of the present invention.

Let us assume "input code 1" as follows.

L GPR1,220(GPR13)
EDMK 280(24,GPR13),304(GPR13)
ST GPR1,220(GPR13)
IPM GPR2,GPR2
SRL GPR2,28

Step 1: The values of UR, UM, UM_CONST, DR, DM, WORK, WORK_REG of the above "input code 1" are as follows. Note that memory accesses are represented as a tuple (BaseREG, OFFSET, SIZE)

UR: Empty (exclude base registers)
UM: (R13, 304, 9)
UM_CONST: (R13, 280, 24)
DR: R1, R2
DM: (R13, 280, 24)
WORK: (R13, 220, 4)
WORK_REG: Empty (exclude base registers)

Step 2: Copy the target code sequence to another memory area and then append a return instruction at the exit point.

Step 3: Compute the minimum offset and the maximum offset for each base register from the union of the four sets UM, UM_CONST, DM, and WORK. In this case, the target code sequence only has one base register R13. Its minimum and maximum offsets are as follows:

R13: minimum=220, maximum=313

Step 4: Allocation size will be 94 (=313−220+1). Assuming that the allocated address is 1000, R13 will be assigned to 780 (=1000−220).

Step 5-1: R13 is assigned to 780.

Step 5-2: From the set UM_CONST, we will assign constant data into R13+280 with the length 24-bytes. From the set UM, we will assign input data into R13+304 with the length 9-bytes. From the set WORK, we will initialize R13+220 with the length 4-bytes by a specific value.

Step 5-3: Execute the copied code sequence.

Step 6: The results will be elements of DR and DM. In this case, R1, R2, and R13+280 (length: 24-bytes) have the results. We will examine these values.

Optimized code for an input code is as follows, in accordance with an embodiment of the present invention:

| | |
|---|---|
| ST | GPR3, [GPR1] 12(GPR10) |
| VSTRL | VRF16,432(GPR10),0x8 |
| UNPK | 408(3,GPR10), 432(2,GPR10) |
| IIHF | GPR4,1075855392 |
| UNPK | 410(15,GPR10), 433(8,GPR10) |
| CXPT | FPR12:FPR14, 432(9,GPR10),0x8 |
| IILF | GPR4,543891488 |
| ICMH | GPR4,0x5, 408(GPR10) |
| ESXTR | GPR3,FPR12 |
| ICM | GPR4,0xb, 410(GPR10) |
| STG | GPR4, 280(GPR2) |
| IIHF | GPR4,543891488 |
| IILF | GPR4,543891488 |
| ICMH | GPR4,0xb, 413(GPR10) |
| ICM | GPR4,0xb, 416(GPR10) |
| STG | GPR4,288(GPR2) |
| IIHF | GPR4,543891489 |
| IILF | GPR4,541794336 |
| ICMH | GPR4,0xb, 419(GPR10) |
| ICM | GPR4,0xb, 422(GPR10) |
| OILL | GPR4,0xf0 |
| STG | GPR4, 296(GPR2) |
| LHI | GPR4,0x0 |
| STC | GPR4, 304(GPR2) |
| LARL | GPR6, <Literal Pool> |
| LLC | GPR4, 192(GPR3,GPR6) |
| LTR | GPR4,GPR4 |
| BRC | BZ(0x8), Label L0098 |
| AHI | GPR4,0xffff |
| BRC | J(0xf), Label L0176 |
| Label L0192: | |
| MVC | 281(1,GPR2), 280(GPR2) |

| Label L0176: | |
|---|---|
| EXRL | GPR4,<Target of Execute> |
| Label L0098: | |
| LGDR | GPR4,FPR12 |
| LTGR | GPR4,GPR4 |
| BRC | BM(0x4), Label L0100 |
| MVI | 304(GPR2), 0x40 |
| Label L0100: | |
| CHI | GPR3,0x3 |
| BRC | BH(0x2), Label L0101 |
| L | GPR1, [GPR1] 12(GPR10) |
| BRC | MASK15(0xf), Label L0102 |
| Label L0101: | |
| LLC | GPR4, 224(GPR3,GPR6) |
| LA | GPR1, 280(GPR4,GPR2) |
| ST | GPR1,[GPR1] 12(GPR10) |
| Label L0102: | |
| LTXTR | FPR12,FPR12 |
| Label L0097: | |
| IPM | GPR3,GPR3 |
| SRL | GPR3,28 |
| NILF | GPR3,15 |
| ST | GPR3, [GPR2] 20(GPR10) |
| MVC | 220(4,GPR2), [GPR1] 12(GPR10) |

The values of all the sets for "Optimized code 2" are as follows. In this case, registers in the input code are mapped to the virtual registers in memory. Therefore, UR and DR point to the virtual registers in memory. The other registers refer to real registers.

UR: VR16(size: 9-bytes of right-hand side) (Exclude base registers)

UM: Empty

UM_CONST: Empty

DR: R1, R2 (Note: they point to the virtual registers in memory)

DM: (R2, 280, 24)

WORK: (R10, 432, 9), (R10, 408, 17), (R2, 288, 25), (R2, 296, 25), (R2, 304, 25), (R2, 281, 25), (R10, 8, 8), (R2, 220, 4), (R10, 16, 8)

WORK_REG: R3 (Exclude base registers)

Perform steps from 2 to 6. Here are differences from those of "input code 1":

Step 2: "Optimized code 2" include two relative instructions. That is, LARL instruction refers to <Literal Pool>. EXRL instruction refers to <Target of execute>. Therefore, we will copy these memory areas to the new area with keeping the offsets from these instructions.

Step 3: There are two base registers R2 and R10. The minimum and maximum offsets for them are as follows:

R2: minimum=220, maximum=329

R10: minimum=8, maximum=441

Step 4: For R2, the allocation size will be 110 (=329-220+1). Assuming that the allocated address is 1000, R2 will be assigned to 780 (=1000-220). For R10, the allocation size will be 434 (=441-8+1). Assuming that the allocated address is 1200, R10 will be assigned to 1192 (=1200-8).

Step 5-1: R2 and R10 are assigned to 780 and 112, respectively.

Step 5-2: From the UR, we will assign input data into the right 9-bytes of the vector register VR19. We will initialize memory areas in WORK and the real register R3 by a specific value.

Step 6: Compare the value of each register in DR for the input code and DR for the optimized code. Compare the value of each memory area in DM for the input code and DM for the optimized code. If both comparisons are equal, we will execute the optimized code. Otherwise, we will execute the input code.

Execute the copied "input code 1" and the copied "optimized code 2" with several input data. The candidates of input data in this example are as follows: Valid data: Plus zero and minus zero. Each number of digits with plus and minus. If the number of digits is 2, examples of test data are +1, +12, −1, −12, +0, −0.

Invalid data: A combination of "invalid digit" and "invalid sign".

Then, we will compare the two result sets described hereinabove. That is, we will compare the values in R1 and R2 for the input code and the values in virtual registers R1 and R2 for the optimized code. Then, we will compare the value in [R13+280] for the input code and the value in [R13+280] for the optimized code. If the results are different, we will use "input code 1" as the generated code. If the results are the same, we will use "optimized code 2" as the generated code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for validating a compiler-generated program portion that forms an optimized runnable code relative to an input runnable code, comprising:

computing, by a hardware processor, respective data sets used by the compiler-generated program portion, the respective data sets including (i) memory inputs UM, (ii) constant data memory areas UM_CONST, (iii) output memory areas DM, and (iv) output registers DR;

copying, by the hardware processor, the compiler-generated program portion to another memory area from a current memory area and appending a return instruction back to the current memory area at each exit point of the compiler-generated program portion;

computing, by the hardware processor, minimum and maximum base register offsets for base registers, from a union formed from a subset of the respective data sets;

computing, by the hardware processor, an allocation size for each of the base registers and an address assigned to each of the base registers; and executing, by the hardware processor, the copied compiler-generated program portion using (a) the minimum and maximum base register offsets, (b) the allocation size, and (c) the address assigned to each of the base registers, executing the input runnable code, examining results of the input runnable code in the output memory areas DM and of the compiler-generated program portion in the output registers DR, and indicating that the compiler-generated program portion is valid responsive to the results being identical.

2. The computer-implemented method of claim 1, wherein the hardware processor comprises a binary optimizer.

3. The computer-implemented method of claim 1, wherein the compiler-generated program portion is copied to the other memory area using an effective address with an offset responsive to the compiler-generated program portion including a relative instruction which computes the effective address from a current instruction pointer and the offset.

4. The computer-implemented method of claim 1, wherein the respective datasets for the memory inputs are computed by the hardware processor from information obtained from a code generator that generated the compiler-generated program portion.

5. The computer-implemented method of claim 1, further comprising replacing the input runnable code with the optimized runnable code, respective to an indication that the optimized runnable code is valid, and executing a program including the optimized runnable code.

6. The computer-implemented method of claim 1, wherein appending a return instruction comprises assigning each exit point from among multiple exit points to a register unincluded in the output registers.

7. The computer-implemented method of claim 1, wherein the respective data sets further include register inputs UR.

8. The computer-implemented method of claim 1, wherein the register inputs UR comprise input parameters on memory areas at entry points of the target code sequence.

9. The computer-implemented method of claim 1, wherein the union formed from the subset of the respective data sets comprises the memory inputs UM, the constant data memory areas UM_CONST, and the output memory areas of the compiler-generated program portion DM.

10. The computer-implemented method of claim 9, wherein the union is formed from another data set of registers used in the compiler-generated program portion, excluding register inputs UR and the base registers.

11. The computer-implemented method of claim 1, wherein only the compiler-generated program portion of an entire program is selectively checked for validation.

12. The computer-implemented method of claim 1, further comprising providing an indication of invalidity for the compiler-generated program portion responsive to invalid data between the input runnable code and the compiler-generated program portion in forms of invalid digits and invalid data signs.

13. The computer-implemented method of claim 1, wherein the allocation size is computed as the maximum base register offset minus the minimum base register offset plus one.

14. The computer-implemented method of claim 1, wherein the address assigned to each of the base registers is computed as an allocated address minus the minimum base register offset.

15. A computer program product for validating a compiler-generated program portion that forms an optimized runnable code relative to an input runnable code, the computer program product comprising a non-transitory computer readable storage medium having program instructions embodied therewith, the program instructions executable by a computer to cause the computer to perform a method comprising:

computing, by a hardware processor, respective data sets used by the compiler-generated program portion, the respective data sets including (i) memory inputs UM, (ii) constant data memory areas UM_CONST, (iii) output memory areas DM, and (iv) output registers DR;

copying, by the hardware processor, the compiler-generated program portion to another memory area from a current memory area and appending a return instruction back to the current memory area at each exit point of the compiler-generated program portion;

computing, by the hardware processor, minimum and maximum base register offsets for base registers, from a union formed from a subset of the respective data sets;

computing, by the hardware processor, an allocation size for each of the base registers and an address assigned to each of the base registers; and executing, by the hardware processor, the copied compiler-generated program portion using (a) the minimum and maximum base register offsets, (b) the allocation size, and (c) the address assigned to each of the base registers, executing the input runnable code, examining results of the input runnable code in the output memory areas DM and of the compiler-generated program portion in the output registers DR, and indicating that the compiler-generated program portion is valid responsive to the results being identical.

16. The computer program product of claim 15, wherein the hardware processor comprises a binary optimizer.

17. The computer program product of claim 15, wherein the compiler-generated program portion is copied to the other memory area using an effective address with an offset responsive to the compiler-generated program portion including a relative instruction which computes the effective address from a current instruction pointer and the offset.

18. The computer program product of claim 15, wherein the respective datasets for the memory inputs are computed by the hardware processor from information obtained from a code generator that generated the compiler-generated program portion.

19. The computer program product of claim 15, wherein the method further comprises replacing the input runnable code with the optimized runnable code, respective to an indication that the optimized runnable code is valid, and executing a program including the optimized runnable code.

20. A computer processing system for validating a compiler-generated program portion that forms an optimized runnable code relative to an input runnable code, comprising:

a memory device including program code stored thereon;

a hardware processor, operatively coupled to the memory device, and configured to run the program code stored on the memory device to compute, by a hardware processor, respective data sets used by the compiler-generated program portion, the respective data sets including (i) memory inputs UM, (ii) constant data memory areas UM_CONST, (iii) output memory areas DM, and (iv) output registers DR;

copy the compiler-generated program portion to another memory area from a current memory area and appending a return instruction back to the current memory area at each exit point of the compiler-generated program portion;

compute minimum and maximum base register offsets for base registers, from a union formed from a subset of the respective data sets;

compute an allocation size for each of the base registers and an address assigned to each of the base registers; and execute, the copied compiler-generated program portion using (a) the minimum and maximum base register offsets, (b) the allocation size, and (c) the address assigned to each of the base registers, execute the input runnable code, examine results of the input runnable code in the output memory areas DM and of the compiler-generated program portion in the output registers DR, and indicate that the compiler-generated program portion is valid responsive to the results being identical.

* * * * *